Oct. 15, 1935.   C. B. BECK   2,017,200
METHOD AND MEANS FOR MOUNTING PRINTS
Filed March 15, 1934   3 Sheets-Sheet 1

INVENTOR
Charles B. Beck,
BY
Frederick Breitenfeld
ATTORNEY

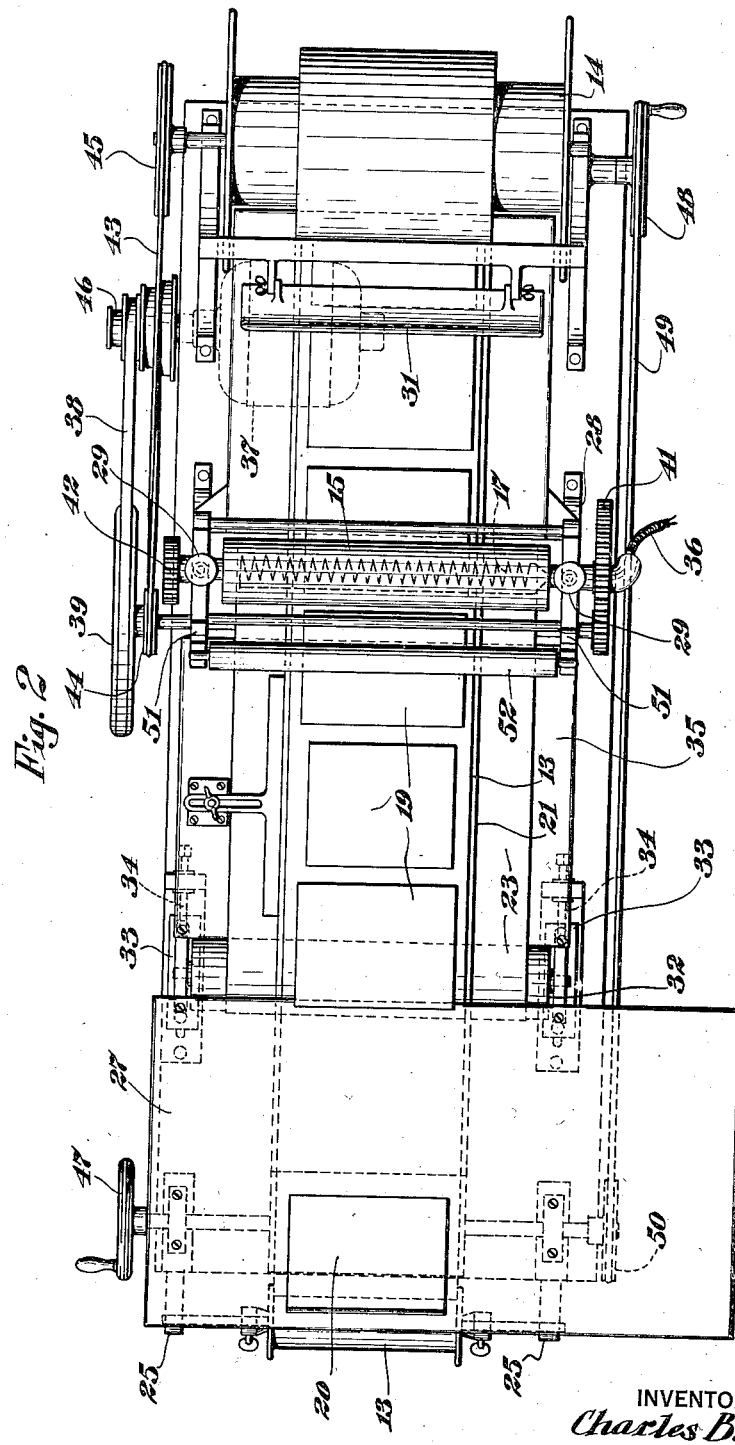

Oct. 15, 1935.  C. B. BECK  2,017,200
METHOD AND MEANS FOR MOUNTING PRINTS
Filed March 15, 1934  3 Sheets-Sheet 3
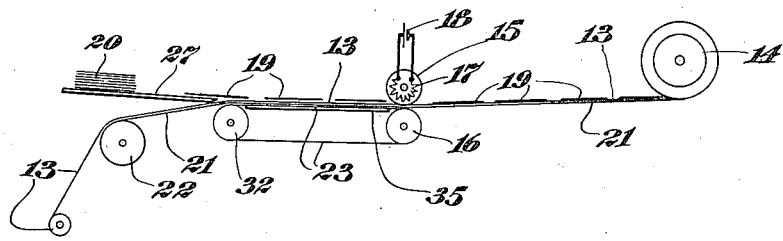
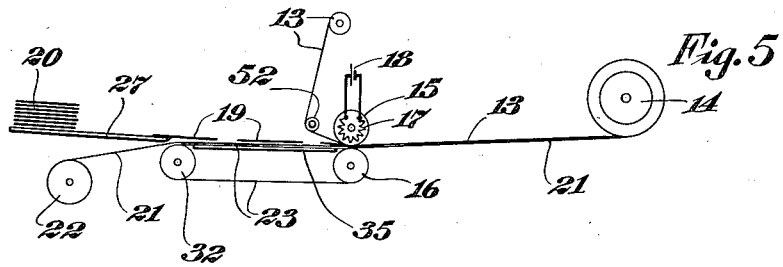
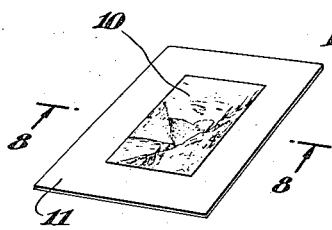
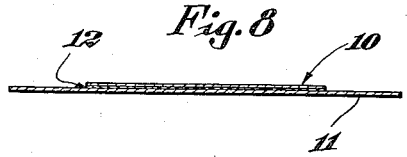
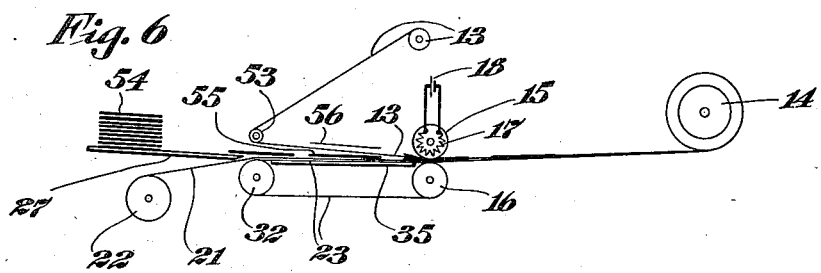
INVENTOR
Charles B. Beck,
BY
Frederick Reitenfeld
ATTORNEY Patented Oct. 15, 1935

2,017,200

UNITED STATES PATENT OFFICE 2,017,200

METHOD AND MEANS FOR MOUNTING PRINTS

Charles B. Beck, Brooklyn, N. Y., assignor to Rudolf Lesch Fine Arts, Inc., New York, N. Y., a corporation of New York Application March 15, 1934, Serial No. 715,782

1 Claim. (Cl. 154—36)

My present invention relates generally to the mounting of prints or the like, and has particular reference to a new and improved machine and procedure for mounting prints in quantities.

In the association of prints or photographs or the like with a suitable backing or mount, especially on a commercial scale, it is advantageous to employ as a bonding medium a thin sheet of material such as gutta percha or the like which has no appreciable viscidity at normal room temperatures but which may be caused to become tacky when heated. Usually, a piece of this material is first cut to approximately the size of the print to be mounted; it is then caused to adhere to the back of the print; it is then trimmed into more accurate conformity with the print; and the assembly is then applied to the mount and pressed against the mount coordinately with the application of heat; whereby the adhesive bonding material becomes tacky and hence effective to unite the print and its mount. This procedure is obviously tedious and slow and requires considerable skill, especially when it is borne in mind that prints are of varying sizes and configurations, and that it is essential that the adhesive material be fully coextensive in area with the print to properly hold the print in firm permanent engagement with the backing or mount.

It is a general object of my present invention to provide a machine for preliminarily backing a plurality of prints, regardless of size variations, with adhesive material such as gutta percha or the like. The use of the present type of machine effects economies not only from the standpoint of material used, but also in time consumption, it eliminates to a large measure the skill that would ordinarily be required; and it produces more efficient and uniform results.

From one aspect, my invention resides in the provision of a new mode of procedure in the art of mounting prints whereby the labor and cost of mounting large numbers of prints is materially reduced, and the uniformity and high quality of the results are correspondingly increased.

One of the features of my invention lies in advancing a continuous strip of gutta percha (or its equivalent) from a supply reel thereof to a take-up reel; associating with the strip, during its advancement, a plurality of prints that are to be mounted; and subjecting the prints and the gutta percha strip in a predetermined manner to heat and pressure so as to affix the prints, successively, to the continuous strip of gutta percha. In a preferred embodiment of my invention, the gutta percha strip is interwound on the take-up reel with a continuous strip of relatively strong sheet material, such as heavy paper, which serves not only as a reinforcement for the gutta percha but also as a protective layer for the prints that have been affixed thereto.

By winding the continuous gutta percha strip upon a take-up reel, with the plurality of prints affixed thereto, an opportunity is afforded for the prints to become firmly adherent to the gutta percha; and a means is provided for preliminarily conditioning a large number of prints for the ultimate mounting procedure. The material subsequently withdrawn from the take-up reel, at any convenient time or place, is readily subjected to a treatment which involves an accurate trimming of the gutta percha strip into conformity with the individual prints that are carried therewith, whereby each print is provided with an efficient adhesive backing firmly bonded thereto and accurately conforming to the size and configuration of the print. These individual assemblies may then be associated with suitable mounts, in the usual manner.

In another embodiment of my invention, where the ultimate mount is of the same size as the print itself, a plurality of prints are associated with the advancing gutta percha strip on one side of the latter, and a corresponding plurality of mounts are simultaneously associated with the strip on the opposite side thereof, each print being applied in approximate registry with one of the mounts. The ultimate trimming operation is then the only additional step required to produce a plurality of completely mounted prints.

I achieve the foregoing objects, and such other objects as may hereinafter appear or be pointed out, in the manner illustratively exemplified in the accompanying drawings, wherein—

Figure 2 is a plan view thereof;

Figure 3 is a diagrammatic view of the procedure that may be carried out with the machine of Figures 1 and 2;

Figure 4 is an edge view of the gutta percha strip that is wound onto the take-up reel of Figure 3;

Figure 5 is a view similar to Figure 3, illustrating a modified procedure;

Figure 6 is a view similar to Figure 3, illustrating a further modification;

Figure 7 is a perspective view of a mounted print; and

Figure 8 is a cross-sectional view, greatly enlarged, taken substantially along the line 8—8 of Figure 7.

Figure 1:
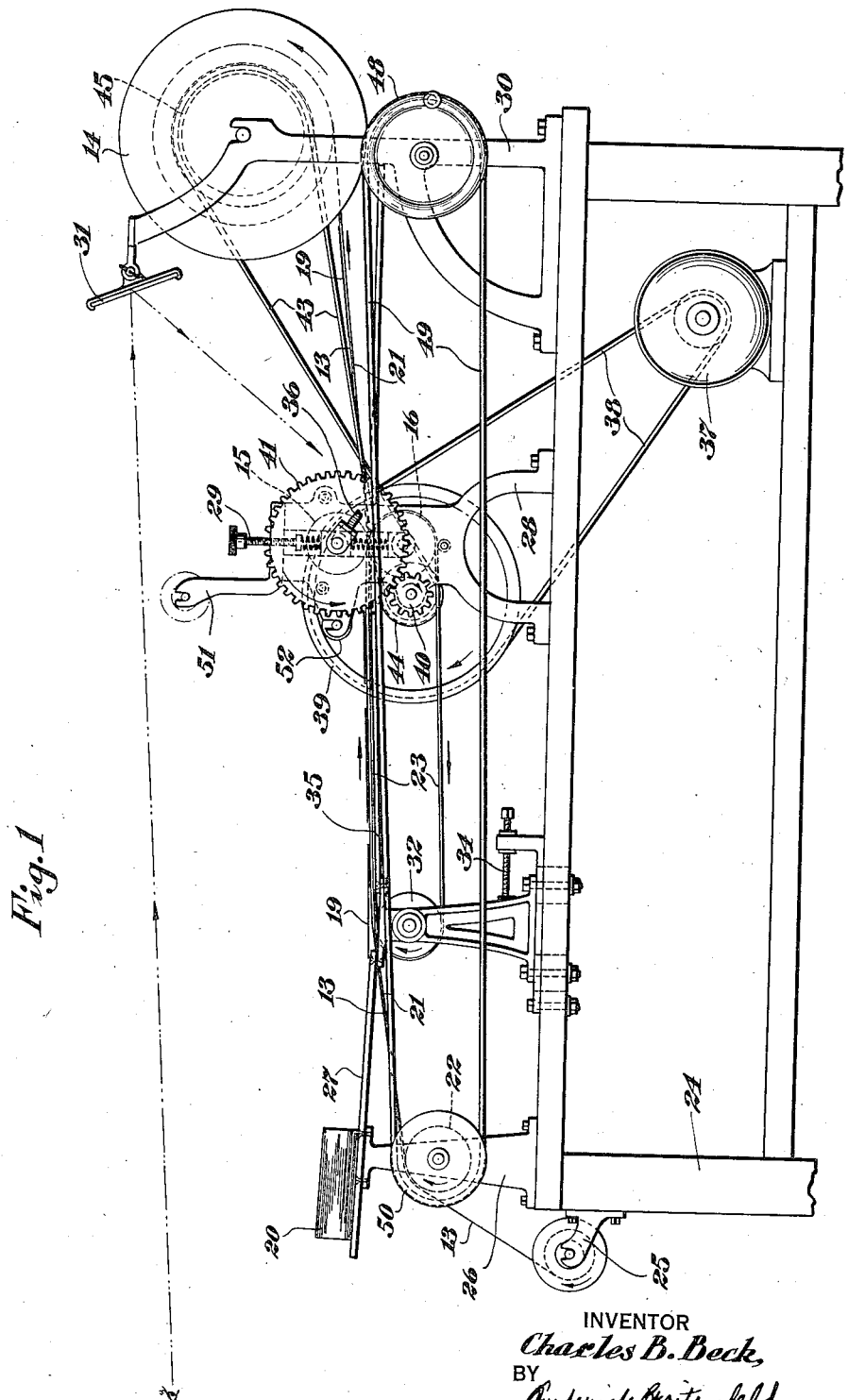
Figure 1 is a side view of a machine embodying the features of my present invention.

Referring for the moment to Figures 7 and 8, I will point out that it is the object of my invention to facilitate the mounting of a print or photograph, such as that designated by the reference numeral 10, upon a suitable mount or backing 11, the latter being, for example, of cardboard or the like.

In Figures 7 and 8 I have shown a mounted assembly in which the print is somewhat smaller than the mount. The union between the print and mount is effected by means of the layer 12 of bonding material, such as sheet gutta percha or its equivalent. It will be understood that the proportions of Figure 8 are grossly exaggerated and that in actual practice the layer or sheet 12 is of extreme thinness and is no more discernible than an ordinary layer of glue or similar adhesive would be.

The present method is most clearly depicted in Figure 3. A suply reel of sheet gutta percha 13 is caused to advance continuously toward and onto a take-up reel 14, and during its advancement it passes between the pressure rollers 15 and 16. At least one of these rollers is heated, and I have illustratively shown the roller 15 provided with an electrical heating coil 17 which may derive its current from a suitable power source 18.

During the advancement of the gutta percha a series of prints 19 are successively applied, face up, to the gutta percha, this being accomplished by an operator who picks the prints successively from a stack 20 and lays them upon the gutta percha just prior to the time when the latter passes between the pressure rollers. The heat and pressure causes the prints to adhere to the gutta percha and the resultant assembly, which is illustrated upon an enlarged scale in Figure 4, is caused to be wound up on the reel 14. The gutta percha strip 13 is preferably of a slightly greater width than the maximum width of the prints that are applied thereto.

As a reinforcement, and as a protective layer for the prints that are wound up on the reel 14, I provide for the simultaneous withdrawal of a web or strip of paper 21 or the like from a supply reel 22, this paper traveling with the gutta percha, in superposed relation thereto, through the pressure rollers and thence into interwound relation with the gutta percha on the take-up reel 14. Ultimately, the paper 21 is rewound onto the reel 22 and may be used over again. It forms no part of the resultant assembly since the heat that is applied to the roller 15 is purposely controlled, so that it is just sufficient to pass through the prints 19 and to soften the gutta percha enough to adhere to the prints, but not to the paper 21.

In the machine itself, which will presently be described, I prefer to provide an endless supporting belt or apron 23 which is arranged in front of the pressure rollers and is mounted on and driven by the lower pressure roller 16.

Referring now to Figures 1 and 2, it will be observed that the entire mechanism is preferably supported upon a suitable base or framework 24. The supply reel of gutta percha is supported upon brackets 25 in a manner which permits this reel to be readily withdrawn for a purpose presently to be described. The paper supply reel 22 is journaled in brackets or stanchions 26, the latter serving also to support the feeding plate 27 upon which the stack of prints 20 has been illustrated.

The pressure rollers 15 and 16 are journaled in the supports 28, and threaded control devices 29 are preferably provided for the purpose of permitting adjustment of the pressure between the rollers 15 and 16.

The take-up reel 14 is removably journaled in the brackets or supports 30, and I also prefer to mount upon these supports a mirror 31 which permits an operator at the front end of the machine to observe the gutta percha as the latter emerges from between the pressure rollers.

The endless supporting belt 23 is preferably of felt or similar soft material, and it extends at one end around the roller 16 and its other end extends around the idler roller 32 mounted within brackets 33. Adjusting means 34 are provided to permit the tension of the belt 23 to be controlled and varied. Immediately below the upper portion of the belt 23 is the rigid supporting plate 35.

At 36 I have shown the conduit which carries the conductors which supply current to the heating coil within the roller 15.

The several parts are driven by means of the motor 37 connected by a belt 38 to a drive wheel 39. The latter is coaxially mounted with a pinion 40 which meshes with the gear 41 carried on the shaft of the pressure roller 15. By means of two superposed spur gears 42, the motion of the upper pressure roller is transmitted to the lower one, so that both of the rollers travel at the same rate of speed. The rotation of the lower pressure roller 16 drives the belt 23 in the direction of the arrows.

The take-up reel 14 is driven from the shaft of the wheel 39 by means of the spring belt 43 engaged around the driving pulley 44 and the driven pulley 45. With the parts in the relationship of Figures 1 and 2, the operation of the machine is initiated by first threading the paper 21 over and along the belt 23, through the pressure rollers, and thence onto take-up reel 14.

The gutta percha sheet or strip 13 is then caused to overlie the paper 21 and is threaded in a similar manner through the pressure rollers and onto the reel 14. When the motor is set into operation, the rotation of the pressure rollers serves to draw the paper and gutta percha from their respective supply reels, through the machine, and onto the take-up reel 14, the varying diameters of the material on the take-up reel 14 being compensated for by the slippage of the belt 43.

Depending upon the thickness of the prints 20, the pressure between the rollers 15 and 16 is then adjusted, and the heating unit is similarly set into operation to develop a predetermined amount of heat. The operator is then required merely to lay one print after another, face up, onto the gutta percha as the latter passes over the supporting plate 35. It make no difference whether the prints are accurately aligned or not, as long as no portion of any print projects beyond the edge of the gutta percha strip. The result is that the prints are successively subjected to the heat and pressure of the rollers 15 and 16, and when the gutta percha emerges from these rollers, the prints are adherent thereto. By winding this resultant assembly onto the take-up reel 14, in conjunction with the reinforcement and protective paper 21, the gutta percha is given an opportunity properly to cool and to adhere firmly and permanently to the prints. This procedure may be carried out with great rapidity, and it is preferable to provide the motor 37 with the stepped-pulley driving arrangement 46, so that the operator may vary the speed with which the machine functions.

After the desired number of prints have been associated with the gutta percha strip, or after the supply of gutta percha from the supply reel has been exhausted, the take-up reel 14 may be withdrawn bodily from the machine and stored for future use; or it may be immediately unwound to permit the subsequent trimming of the gutta percha to be effected. If the take-up reel is withdrawn from the machine, it is a relatively simple matter to insert a new supply reel of gutta percha and a new supply reel of paper, and to again initiate the operation of the machine in connection with an empty take-up reel.

It is frequently desirable to use the present machine as a means for withdrawing the gutta percha from the take-up reel either immediately after the completion of the foregoing operation or at some future time. With this object in view, the shaft of the paper supply reel 22 is provided with the crank handle 47 to permit an operator to rewind the paper from the reel 14 onto the reel 22 by rotating the device 47. To permit an operator to accomplish this same object from the rear end of the machine, I prefer to provide a duplicate crank wheel 48 in the supports 30, a belt 49 extending to a pulley 50 mounted on the shaft of the reel 22.

During the unwinding procedure, the pressure rollers are spread to permit the paper and gutta percha to pass freely between them. At the left end of the plate 35, the paper is threaded downwardly onto the reel 22, while the gutta percha is directed upwardly onto the supporting plate 27. On this plate, the operator may with a suitable knife or other trimming tool accurately trim the gutta percha around each print, discarding any waste gutta percha and laying the resultant backed print into a convenient stack. This procedure is, of course, a step-by-step process, and it is for this reason that the rewinding of the paper is preferably accomplished by hand, the operator turning the crank wheel 47 by a slight amount to bring each successive print into a position for the cutting operation.

The resultant backed prints are then ready to be applied to their respective mounts, at any convenient place or time, and in any usual or desired manner.

In the operation of the machine, as hereinbefore described, and as illustrated in Figures 1 and 2, it will be observed that the heat from each pressure roller 15 is caused to pass through each successive print 19. This is a feasible and advantageous mode of procedure whenever the prints are not inordinately thick. Where the prints have an unusual thickness, it is preferable to operate the machine in the manner illustrated diagrammatically in Figure 5, whereby the supply reel of gutta percha is mounted not upon the brackets 25 but upon the auxiliary brackets 51 provided for this purpose on the supports 28. In such an event, the gutta percha is threaded around the idler roller 52 and thence between the pressure rollers 15 and 16; and the prints that are laid upon the paper which passes over the plate 35 are applied face down with respect to the paper. This presents the prints face up with respect to the gutta percha; and the use of the term "face up" in the appended claim is intended to signify an arrangement whereby the gutta percha is brought into contact with the back of each print. With this mode of operation, the heat from the pressure roller 15 is transmitted directly to the gutta percha sheet, and to avoid an adherence between the gutta percha and the roller 15 the latter is coated with felt or the like and is suitably powdered at intervals. In other respects, the mode of operation is exactly the same as hereinbefore described.

Upon observing Figure 2, it will be seen that the bearings for the various reels are spaced by an amount considerably greater than the width of the gutta percha and paper illustrated by way of example. This is for the purpose of permitting gutta percha strips of greater width to be employed when the prints to be mounted are of larger size. The machine is, of course, limited in its capacity to the width of the pressure rollers 15 and 16.

In Figure 6, I have diagrammatically illustrated a mode of procedure which may be employed where the ultimate mount need not be any larger than the print which it supports. The pressure rollers 15 and 16, the take-up reel 14, the supporting belt 23, and the supply reels of paper and gutta percha are arranged as in Figure 5. However, instead of threading the gutta percha over the guide roller 52, closely adjacent to the pressure rollers, it is directed over the guide roller 53 which is arranged over the idler roller 32. One operator feeds the mounts from the stack 54 successively onto the paper 21. This positions the mounts successively into a sandwiched relation between the paper 21 and the gutta percha 13, as shown by the reference numeral 55 in Figure 6. The other operator applies the prints, face up, to the gutta percha, as indicated at 56, being careful to apply the print in substantial registry with the mount 55 which lies underneath the gutta percha. The gutta percha is somewhat transparent and permits this registry to be effected with considerable accuracy. The passage of the parts through the pressure rollers 15 and 16 causes a simultaneous adherence of the mounts and the prints to the intermediate gutta percha strip. Ultimately, when the strip is unwound from the take-up reel, only a single trimming operation is necessary, the operator trimming not only the gutta percha but also each individual mount into conformity with the size and shape of the print.

The procedure of Figure 6 cannot be employed to produce a mounted print of the character shown in Figures 7 and 8, where the mount is larger than the print and the gutta percha is necessarily coextensive in area only with the print itself.

It will be understood that the term "gutta percha", as the same is used in the appended claim, is intended to include within its significance any similar or equivalent material; and that the terms "print" and "prints", as used in the claim, are intended to refer broadly to the types of articles, including photographs and the like, which are adapted to be mounted upon backs.

In general, it will be understood that changes in the details, herein described and illustrated for the purpose of explaining the nature of my invention, may be made by those skilled in the art without departing from the spirit and scope of the invention as expressed in the appended claim. It is, therefore, intended that these details be interpreted as illustrative, and not in a limiting sense.

Having thus described my invention, and illus- trated its use, what I claim as new and desire to secure by Letters Patent is—

In the herein-described method of mounting prints, the step or steps which consists in continuously advancing a strip of gutta percha from a supply reel to a take-up reel, applying to the gutta percha, during its advancement, a plurality of prints, face up, subjecting said prints, successively, to heat and pressure so as to cause them to adhere to said strip, and interwinding the gutta percha on the take-up reel with a continuous reinforcement strip of relatively strong sheet material.

CHARLES B. BECK.